United States Patent [19]

Badding et al.

[11] Patent Number: 5,560,752
[45] Date of Patent: Oct. 1, 1996

[54] PROCESS FOR ACTIVATION OF METAL HYDRIDES

[75] Inventors: Michael E. Badding, Somerville; Mark T. McCormack, Summit; Donald W. Murphy, Green Brook; Brijesh Vyas, Warren, all of N.J.

[73] Assignee: Lucent Technologies Inc., Murray Hill, N.J.

[21] Appl. No.: 292,556

[22] Filed: Aug. 18, 1994

[51] Int. Cl.$^6$ .............................. H01M 6/00; C01B 6/00; C22C 1/00
[52] U.S. Cl. .................... 29/623.1; 205/107; 205/316; 205/704; 420/900; 423/644; 429/50; 429/59; 429/101
[58] Field of Search .................. 423/644; 429/50, 429/59, 101; 29/623.1; 205/107, 316, 704; 420/900

[56] References Cited

U.S. PATENT DOCUMENTS

| | | | |
|---|---|---|---|
| 4,537,761 | 8/1985 | Reed et al. | 423/644 |
| 4,621,417 | 11/1986 | Mohri et al. | 423/644 |
| 4,716,088 | 12/1987 | Reichman et al. | 423/644 |
| 4,728,580 | 3/1988 | Grasselli et al. | 423/644 |
| 5,298,037 | 3/1994 | Murphy et al. | 423/644 |

FOREIGN PATENT DOCUMENTS 0307209  3/1989  European Pat. Off. .

OTHER PUBLICATIONS

Patent Abstracts of Japan, vol. 014 No. 524 (E–1003), 16 Nov. 1990 & JP–A–02 220355 (Furukawa Battery Co. Ltd: The) 3 Sep. 1990. (Abstract).
E. L. Huston and E. D. Sandrock, *Journal of Less Common Metals*, pp. 435–443 1980.
*Topics in Applied Physics*, 63, L. Schlapbach, ed. Springer–Verlag, Berlin, 1988.
*Topics in Applied physics*, 67, L. Schlapbach, ed., Springer–Verlag, Berlin, 1992.

Primary Examiner—Wayne Langel
Attorney, Agent, or Firm—Richard J. Botos

[57] ABSTRACT

Metals useful in the formation of hydrides for applications such as batteries are advantageously activated by hydriding/dehydriding process. This process involves repeatedly stepping the potential of metal/metal hydride electrodes in electrochemical cells. The process activates hydrogen-storing materials that are difficult to activate by conventional means.

22 Claims, 1 Drawing Sheet

PROCESS FOR ACTIVATION OF METAL HYDRIDES

BACKGROUND OF THE INVENTION

1. Field of the Invention

This invention relates to metal hydrides and in particular to processes involving such hydrides.

2. Art Background

Metal hydrides are used in a variety of industrial applications. Although there are many such applications, possibly the most prominent is the use of metal hydrides in batteries. For example, secondary nickel-metal hydride batteries employ lanthanum nickel hydride (or alloy modifications) or other intermetallic hydrides in the negative electrode. A variety of other uses involving energy storage and transfer have been described. Irrespective of the application, a crucial step in preparation is activation of the hydrideable element, alloy, intermetallic compound, or mixture thereof (referred to generally herein as "metals"). Activation increases the rate at which the metal reacts with hydrogen or the extent to which hydrogen is incorporated into the intermetallic, thus making the metal useful for energy storage and energy transfer applications.

Activation is believed to result from 1) removal of reducible surface oxides which tend to interfere with the functioning of the material in the ultimate desired application; 2) reduction of particle size resulting from an increase in volume, which fractures the metal particles; and (3) changes in the chemical composition and/or structure of the metal or the surface of the metal. Thus, activation, it is believed, increases the surface area and perhaps alters the chemical composition and/or structure of the metal and/or the surface of the metal, any combination of which may lead to higher rates of reaction with hydrogen, enhancing the operation of the material for applications such as batteries or hydrogen storage. Metals with this enhanced chemical reactivity toward hydrogen are referred to as activated.

Methods for activating metal hydrides include: 1) hydriding with hydrogen gas at high temperature and/or high pressure; 2) hydriding with chemical hydriding reagents;. 3) etching with reagents such as aqueous hydrofluoric acid or hot potassium hydroxide; 4) electrochemical anodic oxidation; and 5) conventional battery cycling of metal hydride electrodes. Such methods can require relatively large expenditures for suitable equipment and vary in their effectiveness, depending upon the metal being activated. Thus, alternatives would be quite desirable.

SUMMARY OF THE INVENTION

Activation of metal hydrides is accomplished by incrementally hydriding and dehydriding the metal a plurality of times in a pulsed manner until the desired degree of activation is obtained. The metal is pulsed by subjecting the metal to a hydriding force and a dehydriding force in an alternating fashion. The metal is hydrided by exposing the metal to a hydriding force such as a hydriding potential, which introduces hydrogen into the metal, for a short period of time. The metal is then exposed to a hydriding force such as dehydriding potential, which is thermodynamically sufficient to force hydrogen out of the metal, for a short period of time. The pulsing cycle is then repeated a plurality of times until the metal is activated to the desired degree. For purposes of the invention, the forces in the pulsing cycle can be applied in either order, i.e. dehydriding force followed by hydriding force or vice-versa.

The extent to which the metal is activated depends upon the duration of the individual pulses in the pulsing cycle, the switching times between pulses, and the number of such pulsing cycles. In this regard, it is advantageous if the metal is hydrided to some significant extent in each pulsing cycle, i.e. at least about one-tenth of one percent of its total capacity, but no more than about ten percent of its total capacity. To achieve this objective, the time of the individual hydriding force pulse and dehydriding force pulse in each cycle will vary from metal to metal, but is typically about 10 to about 1000 seconds. It is advantageous from a processing perspective if the hydriding pulse time is the same as the dehydriding pulse time.

The metal is subjected to the hydriding force and the dehydriding force in a number of different ways. Examples of these forces include hydrogen pressures, chemical oxidizing (e.g. $O_2$) and reducing (e.g. borohydride) agents, and electrochemical potentials. In a preferred embodiment, the metal is formed into an electrode. The electrode is then placed in an aqueous electrochemical cell. The cell is stepped between a reducing potential and an oxidizing potential. The cell is stepped by changing from one potential to the other at a very fast rate, e.g. $10^3$ V/sec. or more. The reducing potential is thermodynamically sufficient to cause a net flux of hydrogen into the metal. The oxidizing potential is thermodynamically sufficient to cause a net flux of hydrogen out of the metal.

The potentials and the length of time that the metal is subjected to these potentials is varied depending upon the free energy of the formation reaction of the resulting metal hydride and the free energies of other reactions such as corrosion of the metal or hydrogen gas evolution. The selected potentials are thermodynamically sufficient to drive these reactions in the desired direction.

For example, an electrode made of equimolar parts zirconium (Zr), chromium (Cr) and nickel (Ni) is placed in an electrochemical cell (with a conventional NiOOH/Ni(OH)$_2$ counterelectrode, which is also used as a reference electrode, in an electrolyte of 30% by weight KOH in water) and subjected to a hydriding potential (also referred to as a reducing potential) of about −1.25 V to about −1.8 V for about 10 to about 1000 seconds. The electrode is then subjected to a dehydriding potential (also referred to as an oxidizing potential) of about −0.4 volts to about −1.2 volt for about 10 to 1000 seconds. The time taken to switch from the hydriding potential to the dehydriding potential, or from the dehydriding potential to the hydriding potential, is about 0 seconds to about 2000 sec. The pulsed cycle is repeated a plurality of times.

The metals that form stable metal hydrides are generally known. Typically, such metals are nickel-containing metal compounds. The other components of the material are selected using a variety of criteria. Typically, such metals include what are typically referred to as the intermetallic $AB_5$ and $AB_2$ materials wherein A and B denote at least two different metal components. Other metal components can be incorporated into these intermetallic materials. The Zr—Cr—Ni metal system (i.e. $ZrCr_{2-x}Ni_x$ wherein $0.5 < x < 2$) is provided as one example of a material that is activated to form a metal hydride using the process of the present invention. This metal system is not readily activated using other conventional activating processes. Examples of other metals that are activated by this process include Pd, $Zr_7Ni_{10}$, $Ti_{2-x}Ni_x$ ($0 < x < 1$), $Zr_{1-x}A_xCrNi$ ($0 < x < 0.5$; A=Ti, Hf), LaNi$_5$, A$_x$B$_y$C$_z$(x<0.8, y<0.8,z>0.2 and x+y+z=1; A=Ti, Zr,Hf, B=V, Cr, Mn, Fe, Co, Cu, Mo; C=Ni, Pd), and MmNi 3.5Al$_{0.8}$Co$_{0.7}$, (Mm stands for mischmetal, a mixture of rare earths). The process is contemplated as particularly useful for activating those materials that are not readily activated by other conventional processes. The process is also contemplated to be used alone in activating metals or in combination with other techniques for activating metals.

DETAILED DESCRIPTION

Figure 1:
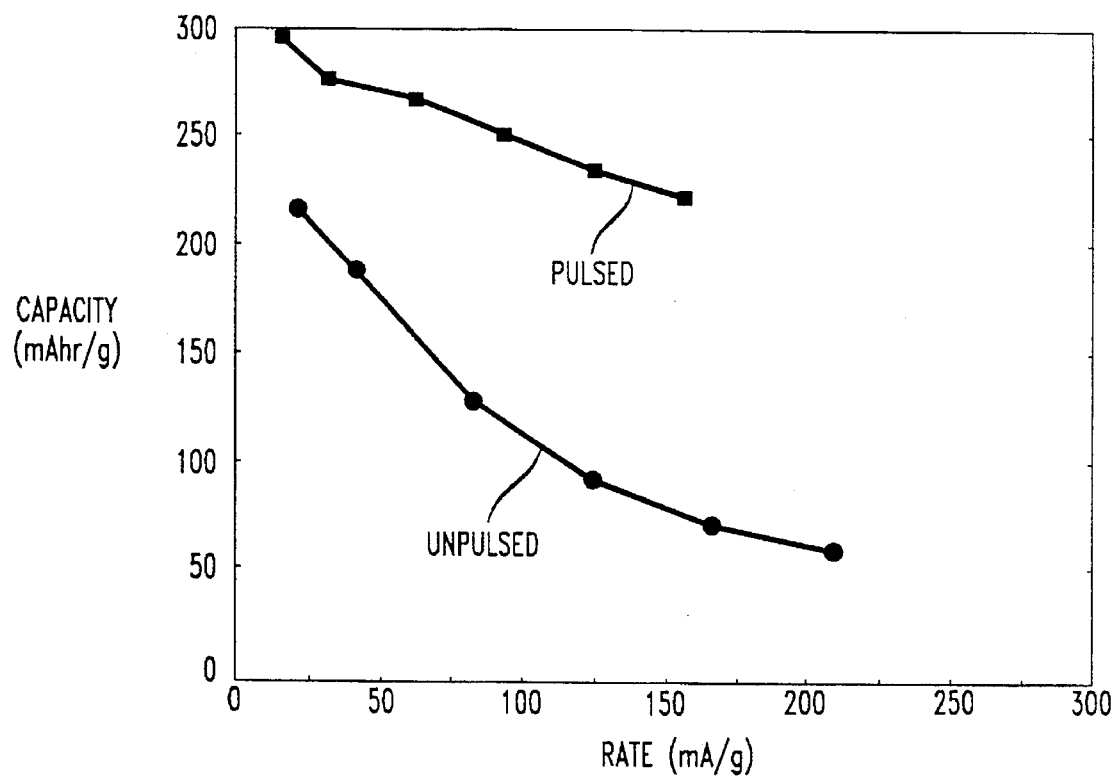
FIG. 1 is a graph of the capacity vs. the rate of discharge of a ZrCrNi electrode activated by the process of the present invention (pulsed) with a ZrCrNi electrode activated by conventional battery cycling.

Metals suitable for use in hydrogen absorption (hydrided)/desorption (dehydrided) applications are activated for greater rates of hydrogen absorption and desorption by pulsing between a hydriding force and a dehydriding force a plurality of times. Typical metals including elements, alloys, and intermetallic materials are employed in such conversions. Examples of such metals are Pd, Zr$_7$Ni$_{10}$, ZrCr$_{2-x}$Ni$_x$, Zr$_{1-x}$A$_x$CrNi, Ti$_{2-x}$Ni$_x$, LaNi$_5$, A$_x$B$_y$C$_z$, and MmNi$_{3.5}$Al$_{0.8}$Co$_{0.7}$. Basically, for the inventive procedure to be advantageous, a metal should (1) be capable of forming a hydride with a hydrogen vapor pressure (at the reaction temperature) of approximately 20 atmospheres or less, and (2) have an effective chemical hydrogen diffusivity of at least 10$^{-16}$ cm$^2$/sec. at the reaction temperature (usually approximately 23° C.) A subset of such materials that are useful includes the metals corresponding to hydrides that produce an electromotive force when employed in a nickel oxide/metal hydride battery.

Vapor pressures of hydrogen for metal hydrides are available in references such as E. L. Huston and E. D. Sandrock, *Journal of Less Common Metals*, 74, p. 435–443 (1980) or *Topics in Applied Physics*, 63, L. Schlapbach, ed., Springer-Verlag, Berlin, 1988, which are hereby incorporated by reference. Chemical hydrogen diffusivity data is determined with sufficient accuracy in this context from information in *Topics in Applied Physics*, 67, L. Schlapbach, ed., Springer-Verlag, Berlin, 1992. Typically, self diffusion rates of hydrogen in metals are measured. However, because the M—MH$_x$ system is generally two phases rather than a single phase with variable x, it is possible that the chemical diffusion rate is greater than the measured amount by several orders of magnitude. Since the measured value is likely to be less than the actual value, it is clear that metals with a measured diffusivity of greater than 10$^{-16}$ cm$^2$/sec will satisfy the criterion. If the measured self diffusion rate is lower than the desired value, however, it is possible to increase the rate by increasing the temperature.

In the activation process described, electrodes comprised of hydrideable metals such as the metals listed above are used. The process is designed to rapidly and repeatedly expose the metal to chemical potentials that are thermodynamically sufficient to either cause hydriding and dehydriding of the metal. This is accomplished by hydriding and dehydriding the metal alternately in a pulsed cycle and repeating that cycle a plurality of times. The metal is hydrided incrementally in each pulsing cycle. For example, one pulsing cycle causes the metal to be hydrided to some extent, i.e. at least about 0.1 percent of the total capacity of the metal. However, one pulsing cycle does not hydride the metal more than about ten percent of its total capacity. By repeatedly pulsing the metal with the hydriding and dehydriding forces, the desired effect is obtained.

In a preferred embodiment the desired hydriding and dehydriding chemical potentials are applied electrochemically at room temperature. Appropriate electrochemical potentials for hydriding or dehydriding a metal are determined from the hydrogen vapor pressures of metal hydrides using the Nernst equation for aqueous electrochemical cells:

$$E=E_O-0.0591 (pH)-0.0295log(P_{H_2}) \quad (1)$$

where $P_{H2}$ is the hydrogen vapor pressure of the hydride, pH is the negative logarithm of the hydrogen ion concentration of the electrolyte, and $E_O$ is the standard potential for the aqueous environment.

Thus, for a metal hydride with a hydrogen vapor pressure of one atmosphere in an aqueous electrochemical cell with a pH of 10, applied potentials (E) that are less than −0.591 volts measured relative to the standard hydrogen electrode are thermodynamically sufficient to cause hydriding and applied potentials that are greater than −0.591 volts are thermodynamically sufficient to cause dehydriding. The rate of hydriding is increased as the hydriding potential is made more negative and the rate of dehydriding is increased as the dehydriding potential is made more positive. Thus it is desirable to make the hydriding potential as negative as possible and the dehydriding potential as positive as possible while avoiding, to a significant extent, side reactions such as hydrogen gas formation or corrosion of the metal. It is advantageous for the potentials to be applied for short periods of time, e.g. less than one minute, with respect to times required to fully hydride/dehydride the metal, which is typically in excess of one hour. It is also advantageous for the potentials to be rapidly switched between the hydriding and dehydriding potentials a plurality of times.

In a preferred embodiment an electrode made of ZrCrNi is used as the working electrode and a conventional NiOOH/Ni (OH)$_2$ (nickel) electrode is used as the counter electrode in an electrochemical cell containing an electrolyte that is 30% by weight KOH (pH=14.8) in an aqueous solution. The potential of the nickel electrode is about +0.385 V in this electrolyte relative to the standard hydrogen electrode. Thus, the voltage, of the hydriding/dehydriding potential measured with respect to the nickel electrode is given by:

$$E_{meas}=-0.385-0.591(pH)-0.0295log(P_{H_2}) \quad (2)$$

When activation is carried out in such an electrochemical cell, the cell is capable of being used directly as a battery after such activation process without reassembly. However, it is also contemplated that the material will be removed from the activation cell, washed with water, dried, and remade into another electrode without loss of activation. Similarly, if the activated material is transferred into a system for reaction with hydrogen gas, there is no need to activate the material again before it is hydrided.

The hydrogen vapor pressure in the ZrCrNi system is about 0.01 to about one atmosphere, depending upon the hydrogen content of the metal. A hydriding potential of about −1.25 V or less (more negative) is selected by solving for $E_{meas}$ in equation (2) using; a $P_{H_2}$ of one atmosphere and a pH of 14.8. This is the potential needed to drive hydrogen into the metal where the hydrogen content in the metal is near the maximum. A dehydriding potential of about −1.2 V or greater (less negative) is selected by solving for $E_{meas}$ in equation (2) using a $P_{H2}$ of 0.01 atm. This is the potential needed to drive hydrogen from the metal when the concentration of hydrogen in the metal is near its minimum. In the preferred embodiment, a metal electrode is activated by holding the voltage in the previously described electrochemical cell at a reducing (hydriding) potential of about −1.7 V (vs. the nickel electrode) for about 50 seconds. The voltage is then stepped to an oxidizing (dehydriding) potential of −1 V (vs. the nickel electrode) for about 50 seconds. The cycle is repeated until the metal is activated to the desired extent. To completely activate the ZrCrNi electrode, the cycle is repeated continuously for at least about one hour up to thirty-six hours or more. Typically the ZrCrNi system is activated in about eight to about twenty-four hours using the described process. Under these conditions, the extent to which the metal is hydrided and dehydrided per cycle is less than about 1% of the total possible.

The following Examples are illustrative of conditions useful in the invention.

EXAMPLE 1

Equimolar amounts of Zr, Cr, and Ni were combined to provide one gram of the metal mixture ZrCrNi. The metals were melted together in an arc furnace under a gettered argon flow. The resulting button was turned over and remelted three times to increase its homogeneity. The button was then ground in an air atmosphere and sieved so that the particle size was about 53 microns or less.

An electrode was then formed from the material by pressing 300 mg of the powder between two Ni mesh screens using a ½ inch die under 6,000 kg of force. An electrochemical cell was assembled by placing the ZrCrNi electrode between two 1.5 inch square NiOOH/Ni (OH) 2 counter electrodes. Polypropylene separator material was inserted between the electrodes. The electrodes were placed in an open beaker containing an electrolyte solution of aqueous KOH (30% by weight).

The electrochemical cell was electrically pulsed under the following conditions. The cell was first subjected to a potential of −1 volt for 50 seconds. The potential was then stepped to a potential of −1.7 volts and held there for 50 seconds. The potential was then stepped back to the −1 volt potential to complete one cycle. The cycle was repeated continuously over a period of twenty-four hours. For purposes of these examples, a step change in the voltage is a change at a rate of at least $10^3$ V/sec.

Following the pulse activation of ZrCrNi as previously described, an analysis of particle size by light scattering showed no significant reduction in overall particle size. Several physical characterization techniques showed that the metal on the surface of the particle is depleted of Cr and has a reduced Zr content relative to the unactivated ZrCrNi. The surface of the particle also contained oxidized Zr. Consequently, the surface of the activated ZrCrNi was determined to be Ni-rich compared to the unactivated material. The magnetic susceptibility of the activated ZrCrNi showed a ferromagnetic component with a susceptibility similar to that of amorphous $Zr_xNi_{1-x}(X<0.2)$ which is known to form metal hydrides. Although applicants do not wish to be held to a particular theory, applicants believe that: 1) an amphorous $Zr_xNi_{1-x}$ surface may act as a corrosion protecting layer that can transport hydrogen at high rates; and/or 2) that pulse activation increases the nucleation sites in the bulk metal thereby increasing the rate at which the metal is hydrided and dehydrided.

EXAMPLE 2

After the ZrCrNi electrode was activated as in Example 1, the electrode was cycled in the same electrochemical cell as a battery electrode i.e., the electrode was charged at a constant current of 10 mA for 13 hours and then discharged at a constant current of 10 mA until the voltage reached 1 V. The pulse-activated electrodes delivered a capacity of 272 mA-h/g on the first battery cycle. Another electrode, prepared as described in Example 1, but with no activation other than battery cycling delivered a capacity of 210mA-h/g after 15 battery cycles.

Subsequent to this test, both electrodes were battery cycled at increasing rates of discharge, from 5 mA to 50 mA. As shown in FIG. 1, the pulse-activated electrode had a significantly higher capacity at all discharge rates, which demonstrated the enhanced rate capability of the pulse;activated material compared to the electrode that was activated by conventional battery cycling.

EXAMPLE 3

Electrodes made of various materials were constructed and pulse activated in an electrochemical cell as described in Example 1. The electrochemical cells containing electrodes made of these materials were then subjected to conventional battery cycling. The materials of which these electrodes were made are enumerated below. The capacities delivered on the first battery cycle (in mA-hr/g) follow each material in parenthesis. The materials were: $Zr_7Ni_{10}$ (142), $ZrCr_{1.1}Ni_{0.9}$ ( 350), $ZrCr_{1.2}Ni_{0.8}$ (327), $Zr_{0.8}Ti_{0.2}CrNi$ (336), $Zr_{0.7}Ti_{0.3}CrNi$ (311), $Zr_{0.9}Hf_{0.1}CrNi$ ( 260), $Zr_{0.21}V_{0.42}Ni_{0.37}$ (280), ZrVNi (270), $LaNi_5$ (320), and $Ti_3Ni_2$ (250). Each of these materials demonstrated a higher capacity than materials activated by conventional battery cycling. For example $Zr_7Ni_{10}$ that was activated by battery cycling had a capacity of about 50 mA-hr/g.

A commercial sub-micron Pd powder was also constructed as an electrode, again using the techniques described in Example 1. The electrode was then pulse activated as described in Example 1 and had a resulting capacity of 200 mA-hr/gm.

EXAMPLE 4

Electrochemical cells containing a ZrCrNi electrode prepared as described in Example 1 were subjected to pulsed activation cycles under a variety of conditions to determine the effects of these conditions on electrode performance. Specifically, the hydriding potential (samples a–d), the dehydriding potential (samples e–k), the time interval to which the sample was subjected to a particular potential (samples 1–n), the rate of change from one potential to the other (samples o–q) and the total time that the electrode was pulsed (samples r–u) were varied. A "step" rate of change is a rapid change in voltage at a rate of 1000 V/sec. These conditions and their effect on electrode capacity at a discharge current of 35 mA, are summarized in Table 1 below. Generally capacities of 200 mA-hr/g or higher are desired for acceptable electrode performance.

TABLE I

| Sample | Oxidizing Potential | Reducing Potential | Potential Time Interval (s) | Rate of Change (mV/s) | Total Pulse Time (hrs) | Capacity (mAhr/g) |
|---|---|---|---|---|---|---|
| a | −1 V | −1.25 V | 50 | step | 24 | 85 |
| b | −1 V | −1.55 V | 50 | step | 24 | 172 |
| c | −1 V | −1.70 V | 50 | step | 24 | 272 |
| d | −1 V | −1.80 V | 50 | step | 24 | 260 |
| e | −0.40 V | −1.7 V | 50 | step | 24 | 33 |
| f | −0.50 V | −1.7 V | 50 | step | 24 | 177 |
| g | −0.70 V | −1.7 V | 50 | step | 24 | 152 |
| h | −0.80 V | −1.7 V | 50 | step | 24 | 283 |
| i | −0.90 V | −1.7 V | 50 | step | 24 | 284 |
| j | −1.1 V | −1.7 V | 50 | step | 24 | 230 |
| k | −1.2 V | −1.7 V | 50 | step | 24 | 104 |
| l | −1 V | −1.70 V | 10 | step | 24 | 207 |
| m | −1 V | −1.70 V | 100 | step | 24 | 266 |
| n | −1 V | −1.70 V | 1000 | step | 24 | 84 |
| o | −1 V | −1.70 V | 50 | 100 | 24 | 265 |
| p | −1 V | −1.70 V | 50 | 10 | 24 | 208 |
| q | −1 V | −1.70 V | 50 | 2 | 24 | 61 |
| r | −1 V | −1.70 V | 50 | step | 8 | 36 |
| s | −1 V | −1.70 V | 50 | step | 18 | 262 |
| t | −1 V | −1.70 V | 50 | step | 72 | 280 |
| u | −1 V | −1.70 V | 50 | step | 248 | 270 |

EXAMPLE 5

A 369 mg. sample of ZrCrNi, activated by the treatment of Example 1 was removed from the cell, washed with water and dried in vacuum. This material was loaded into a thermogravimetric analyzer for measurement of $H_2$ gas absorption at room temperature. After the atmosphere was evacuated, $H_2$ gas was added to a pressure of 46 atmospheres. In five minutes the sample had absorbed 1.2% by wt. of hydrogen. In a separate thermogravimetric experiment, another 369 mg sample of ZrCrNi that had been activated by adding and removing hydrogen gas from the sample several times absorbed only 0.45% by wt. hydrogen in five minutes.

We claim:

1. A process for activating a metal comprising subjecting a metal to a pulse of hydriding force alternated with a pulse of dehyriding force wherein each combination of hyriding a force and a dehyriding force is denominated a pulsed cycle and wherein the metal is subjected to the pulsed cycle a plurality of times, wherein each pulse of hyriding force is for a period of time sufficient to hydride the metal to at least one-tenth of one percent of its hydride capacity but no more than about ten percent of its hydride capacity.

2. The process of claim 1 wherein the hydriding force is a hydriding potential and the dehydriding force is a dehydriding potential.

3. The process of claim 2 wherein the hydriding force and the dehydriding force are electrochemical potentials.

4. The process of claim 1 wherein the metal is selected from the group consisting of $ZrCr_{2-x}Ni_x$, wherein 0.5<x<2, Pd, $Zr_7Ni_{10}$, $LaNi_5$, $Ti_{2-x}Ni_x$, wherein 0<x<1, $Zr_{1-x}Ti_xCrNi$, wherein 0<x<0.5, $Zr_{1-x}Hf_xCrNi$, wherein 0<x<0.5, $A_xB_yC_z$ wherein x<0.8, y<0.8, z>0.2 and x+y+z=1 and A is Ti, Zr, or Hf, B is V, Cr, Mn, Fe, Co, Cu, or Mo, and C is Ni or Pd, and $MnNi_{3.5}Al_{0.8}Co_{0.7}$.

5. The process of claim 3 wherein the metal is selected from the group consisting of $ZrCr_{2-x}Ni_x$, wherein 0.5<x<2, Pd, $Zr_7Ni_{10}$, $LaNi_5$, $Ti_{2-x}Ni_x$, wherein 0<x<1, $Zr_{1-x}Ti_xCrNi$, wherein 0<x<0.5, $Zr_{1-x}Hf_xCrNi$, wherein 0<x<0.5, $A_xB_yC_z$ wherein x<0.8, y<0.8, z>0.2 and x+y+z=1 and A is Ti, Zr, or Hf, B is V, Cr, Mn, Fe, Co, Cu, or Mo, and C is Ni or Pd, and $MnNi_{3.5}Al_{0.8}Co_{0.7}$.

6. The process of claim 3 wherein the metal is an intermetallic composition of the general formula $ZrCr_{2-x}Ni_x$, wherein x is about 0.5 to about 2.

7. The process of claim 3 wherein the metal is an intermetallic composition of the general formula $Ti_{2-x}Ni$, wherein x is about 0 to about 1.

8. The process of claim 3 wherein the metal is an intermetallic composition of the general formula $Zr_{1-x}A_x$-CrNi, wherein x is about 0 to about 0.5 and A is selected from the group consisting of Ti and Hf.

9. The process of claim 3 wherein the metal is an intermetallic composition of the general formula $A_xB_yC_z$ wherein x is less than about 0.8, y is less than about 0.8 and z is greater than about 0.2 and A is selected from the group consisting of Ti, Zr, and Hf, B is selected from the group consisting of V, Cr, Mn, Fe, Co, Cu, and Mo, and C is selected from the group consisting of Ni and Pd.

10. The process of claim 2 wherein the hydriding potential is at least thermodynamically sufficient to drive hydrogen into the metal and the dehydriding potential is at least thermodynamically sufficient to drive hydrogen from the metal.

11. The process of claim 3 wherein the hydriding potential is about −1.25 V to about −1.8 V and the dehydriding potential is about −0.4 V to about −1.2 V with respect to a conventional nickel electrode in an aqueous solution that contains about thirty percent by weight KOH.

12. The process of claim 5 wherein the hydriding potential is about −1.25 V to about −1.8 V and the dehydriding potential is about −0.4 V to about −1.2 V with respect to a conventional nickel electrode in an aqueous solution that contains about thirty percent by weight KOH.

13. The process of claim 11 wherein the metal is subjected to the hydriding potential pulse for about 10 to about 1000 seconds and subjected to the dehydriding potential pulse for about 10 to about 1000 seconds and the pulsed cycle is repeated continuously over a period of time sufficient to activate the metal to the desired degree.

14. The process of claim 12 wherein the metal is subjected to the hydriding potential pulse for about 10 to about 1000 seconds and subjected to the dehydriding potential pulse for about 10 to about 1000 seconds and the pulsed cycle is repeated continuously over a period of time sufficient to activate the metal to the desired degree.

15. The process of claim 13 wherein the period of time sufficient to activate the metals is from about 1 to about 36 hours.

16. The process of claim 14 wherein the period of time sufficient to activate the metal is from about 1 to about 36 hours.

17. A process for fabricating a battery comprising the steps of forming a metal or metal hydride electrode and inserting the electrode in a battery wherein the metal electrode or metal hydride electrode is activated by subjecting a metal to a pulse of hyriding force alternated with a pulse of a dehyriding force wherein each combination of a hydriding force and a dehydriding force is denominated a pulsed cycle and wherein the metal is subjected to the pulsed cycle a plurality of times, wherein each pulse of hydriding force is for a period of time sufficient to hydride the metal to at least about one-tenth of one percent of its hydride capacity but no more than about ten percent of its hydride capacity.

18. The process of claim 17 wherein the hydriding force and the dehydriding force are electrochemical potentials.

19. The process of claim 18 wherein the metal is selected from the group consisting of $ZrCr_{2-x}Ni_x$, wherein $0.5<x<2$, Pd, $Zr_7Ni_{10}$, $LaNi_5$, $Ti_{2-x}Ni_x$, wherein $0<x<1$, $Zr_{1-x}Ti_xCrNi$, wherein $0<x<0.5$, $Zr_{1-x}Hf_xCrNi$, wherein $0<x<0.5$, $A_xB_yC_z$ wherein $x<0.8$, $y<0.8$, $z>0.2$ and $x+y+z=1$ and A is Ti, Zr, or Hf, B is V, Cr, Mn, Fe, Co, Cu, or Mo, and C is Ni or Pd, and $MnNi_{3.5}Al_{0.8}Co_{0.7}$.

20. The process of claim 19 wherein the hydriding potential is about −1.25 V to about −1.8 V and the dehydriding potential is about −0.4 V to about −1.2 V with respect to a conventional nickel electrode in an aqueous solution that contains about thirty percent by weight KOH.

21. The process of claim 20 wherein the metal is subjected to the hydriding potential pulse for about 10 to about 1000 seconds and subjected to the dehydriding potential pulse for about 10 to about 1000 seconds and the pulsed cycle is repeated continuously over a period of time sufficient to activate the metal to the desired degree.

22. The process of claim 21 wherein the period of time sufficient to activate the metals is from about 1 to about 36 hours.

\* \* \* \* \*